US008850565B2

(12) United States Patent
Patrick et al.

(10) Patent No.: US 8,850,565 B2
(45) Date of Patent: Sep. 30, 2014

(54) SYSTEM AND METHOD FOR COORDINATING NETWORK INCIDENT RESPONSE ACTIVITIES

(75) Inventors: Robert Patrick, Thurmont, MD (US); Christopher Key, Bristow, VA (US); Paul Holzberger, Gainesville, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2156 days.

(21) Appl. No.: 10/905,537

(22) Filed: Jan. 10, 2005

(65) Prior Publication Data
US 2006/0212932 A1    Sep. 21, 2006

(51) Int. Cl.
*G06F 11/00* (2006.01)
*H04L 29/06* (2006.01)

(52) U.S. Cl.
CPC .................................. *H04L 63/1441* (2013.01)
USPC .......................................................... 726/22

(58) Field of Classification Search
USPC .......................................................... 726/22
See application file for complete search history.

(56) References Cited

U.S. PATENT DOCUMENTS

| 5,557,742 | A |  | 9/1996 | Smaha et al. |
| 5,717,919 | A |  | 2/1998 | Kodavalla et al. |
| 5,850,516 | A |  | 12/1998 | Schneier |
| 5,956,404 | A |  | 9/1999 | Schneier et al. |
| 5,978,475 | A |  | 11/1999 | Schneier et al. |
| 6,070,244 | A |  | 5/2000 | Orchier et al. |
| 6,088,804 | A | * | 7/2000 | Hill et al. ........................ 726/25 |
| 6,134,664 | A |  | 10/2000 | Walker |
| 6,192,034 | B1 |  | 2/2001 | Hsieh et al. |
| 6,275,942 | B1 |  | 8/2001 | Bernhard et al. |
| 6,321,338 | B1 |  | 11/2001 | Porras et al. |

(Continued)

FOREIGN PATENT DOCUMENTS

| WO | WO 02/45315 A2 | 6/2002 |
| WO | WO 02/060117 A1 | 8/2002 |

(Continued)

OTHER PUBLICATIONS

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

(Continued)

*Primary Examiner* — Teshome Hailu

(57) ABSTRACT

The present invention provides a system and method to process information regarding a network attack through an automated workflow that actively reconfigures a plurality of heterogeneous network-attached devices and applications to dynamically counter the attack using the network's own self-defense mechanisms. The present invention leverages the security capabilities present within existing and new network-attached devices and applications to effect a distributed defense that immediately quarantines and/or mitigates attacks from hostile sources at multiple points simultaneously throughout the network. In a preferred embodiment, deployed countermeasures are automatically lifted following remediation activities.

14 Claims, 7 Drawing Sheets

(56) References Cited

U.S. PATENT DOCUMENTS

| | | | |
|---|---|---|---|
| 6,405,318 B1* | 6/2002 | Rowland | 726/22 |
| 6,408,391 B1 | 6/2002 | Huff et al. | |
| 6,408,404 B1 | 6/2002 | Ladwig | |
| 6,484,203 B1 | 11/2002 | Porras et al. | |
| 6,535,227 B1* | 3/2003 | Fox et al. | 715/736 |
| 6,542,075 B2 | 4/2003 | Barker et al. | |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,839,850 B1 | 1/2005 | Campbell et al. | |
| 6,928,556 B2 | 8/2005 | Black et al. | |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 7,039,953 B2 | 5/2006 | Black et al. | |
| 7,043,727 B2 | 5/2006 | Bennett et al. | |
| 7,089,428 B2 | 8/2006 | Farley et al. | |
| 7,127,743 B1 | 10/2006 | Khanolkar et al. | |
| 7,159,237 B2 | 1/2007 | Schneier et al. | |
| 7,171,689 B2 | 1/2007 | Beavers | |
| 7,194,769 B2* | 3/2007 | Lippmann et al. | 726/25 |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al. | |
| 7,333,999 B1 | 2/2008 | Njemanze | |
| 7,376,969 B1 | 5/2008 | Njemanze et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0184532 A1 | 12/2002 | Hackenberger et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0111637 A1* | 6/2004 | Baffes et al. | 713/201 |
| 2004/0221191 A1 | 11/2004 | Porras et al. | |
| 2004/0250124 A1* | 12/2004 | Chesla et al. | 713/201 |
| 2005/0027845 A1 | 2/2005 | Secor et al. | |
| 2005/0105522 A1* | 5/2005 | Bakshi et al. | 370/389 |
| 2005/0204404 A1 | 9/2005 | Hrabik et al. | |
| 2005/0251860 A1 | 11/2005 | Saurabh et al. | |
| 2006/0037075 A1* | 2/2006 | Frattura et al. | 726/22 |
| 2006/0069956 A1 | 3/2006 | Steinberg et al. | |
| 2006/0095587 A1 | 5/2006 | Bhattacharya et al. | |
| 2006/0101517 A1* | 5/2006 | Banzhof et al. | 726/25 |
| 2007/0097963 A1* | 5/2007 | Thermos | 370/352 |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0214503 A1* | 9/2007 | Shulman et al. | 726/22 |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2010/0058165 A1 | 3/2010 | Bhattacharya et al. | |

FOREIGN PATENT DOCUMENTS

| | | |
|---|---|---|
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in SRI International, Inc. v. Internet Security Systems, Inc. and Symantec Corporation (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

ArcSight, Inc., "ArcSight 3.0 Leads Move to Business-Focused Security Management," Feb. 17, 2004, [online] Retrieved from the Internet: <URL: http://www.arcsight.com/graphics/news/3%200%20Release%20FINAL_web.pdf>.

ArcSight, Inc., "Introducing ArcSight 3.0 (1)," Mar. 2004.

ArcSight, Inc., "Introducing ArcSight 3.0 (2)," Mar. 2004.

ArcSight, Inc., "Introducing ArcSight v3.0: Moving Security Management to the Mainstream," Feb. 2004.

Cisco Systems, Inc., "CiscoWorks Security Information Management Solution (SIMS) 3.2.1," May 2005, [online] Retrieved from the Internet: <URL: http://www.cisco.com/application/pdf/en/us/guest/products/ps5209/c1650/ccmigration_09186a008017dcb6.pdf>.

Cisco Systems, Inc., "CiscoWorks VPN/Security Management Solution 2.3," Aug. 2005, [online] Retrieved from the Internet: <URL: http://www.cisco.com/application/pdf/en/us/guest/products/ps2330/c1650/ccmigration_09186a0080092536.pdf>.

Hewlett-Packard Development Company, L.P., "HP OpenView Network Configuration Manager software," Aug. 2006, [online] Retrieved from the Internet: <URL: http://h20229.www2.hp.com/products/ovncm/ds/ovncm_ds.pdf>.

IBM Corporation, "IBM Tivoli NetView," Apr. 2002, [online] Retrieved from the Internet: <URL: ftp://ftp.software.ibm.com/software/tivoli/datasheets/ds-tivolinetview.pdf>.

Protego Networks, Inc., "PN-MARS (Mitigation and Response System) Enterprise Threat Mitigation Appliance," 2004, [online] Retrieved from the Internet: URL: http://web.archive.org/web/20041230002123/www.protegonetworks.com/resources/mars_datasheet.pdf>.

U.S. Appl. No. 60/405,921, filed Aug. 26, 2002, Gisby et al.

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Enterprise Coverage: Technology Architecture," date unknown, [online] Retrieved from the Internet <URL: http://www.snaiso.com/Documentation/Arcsight/arcsight_archdta.pdf>.

ArcSight, "Managed Process: ArcSight Reporting System," date unknown, [online] Retrieved from the Internet <URL: http://www.snaiso.com/Documentation/Arcsight/arcsight_reportsys.pdf>.

ArcSight, "Managed Process: Console-Based Management," date unknown, [online] Retrieved from the Internet <URL: http://www.snaiso.com/Documentation/Arcsight/arcsight_console.pdf>.

(56) References Cited

OTHER PUBLICATIONS

ArcSight, "Precision Intelligence: SmartRules™ and Cross-Correlation," date unknown, [online] Retrieved from the Internet <URL: http://www.snaiso.com/Documentation/Arcsight/arcsight_correlation.pdf>.
ArcSight, "Precision Intelligence: SmartAgent™," date unknown, [online] Retrieved from the Internet <URL: http://www.ossmanagement.com/SmartAgent.pdf>.
ArcSight, "Product Info: Product Overview and Architecture," date unknown, [online] [Retrieved on Oct. 25, 2002] Retrieved from the Internet <URL: http://www.arcsight.com/product.htm>.
ArcSight, "Product Info: 360° Intelligence Yields Precision Risk Management," date unknown, [online].
ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.
ArcSight, "Product Info: ArcSight Cross-Device Correlation," date unknown, [online] [Retrieved on Oct. 25, 2005] Retrieved from the Internet <URL: http://www.arcsight.com/product_info03.htm>.
ArcSight, "Product Info: ArcSight Manager," date unknown, [online] [Retrieved on Oct. 25, 2002] Retrieved from the Internet <URL: http://www.arcsight.com/product_info04.htm>.
ArcSight, "Product Info: ArcSight Console," date unknown, [online] [Retrieved on Nov. 15, 2002] Retrieved from the Internet <URL: http:www.arcsight.com/product_info05.htm>.
ArcSight, "Product Info: ArcSight Reporting System," date unknown, [online] [Retrieved on Oct. 25, 2002] Retrieved from the Internet <URL: http:www.arcsight.com/product_info06.htm>.
ArcSight, "Product Info: Enterprise Scaling," date unknown, [online] [Retrieved on Oct. 25, 2002] Retrieved from the Internet <URL: http://www.arcsight.com/product_info07.htm>.
ArcSight, "Security Management for the Enterprise," 2002, [online] [Retrieved on Oct. 25, 2002] Retrieved from the Internet <URL: http:www.arcsight.com/>.
ArcSight, "Technical Brief: How Correlation Eliminates False Positives," date unknown, source unknown.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
Derodeff, C. "Got Correlation? Not Without Normalization," 2002, [online] Retrieved from the Internet <URL: http://www.svic.com/papers/pdf/Got-Correlation_rmalization.pdf>.
Cheung, S. et al., "Emerald Intrusion Incident Report: 601 Message Specification," Aug. 10, 2000, System Design Laboratory, SRI International.
National Institute of Standards and Technology (NIST), "Federal Information Processing Standards Publication (FIPS PUB) 199: Standards for Security Categorization of Federal Information and Information Systems", Feb. 2004.
Haley Enterprise, "Production Systems," 2002, [online] [Retrieved on Oct. 29, 2002] Retrieved from the Internet <URL: http://www.haley.com/0072567836705810/ProductionSystems.html>.
Haley Enterprise, "The Rete Algorithm," 2002, [online] [Retrieved on Oct. 29, 2002] Retrieved from the Internet <URL: http://www.haley.com/0072567836705810/ReteAlgorithm.html>.
Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.
Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.
CERT Coordination Center, "Overview of Attack Trends," 2002, [online] Retrieved from the Internet <URL: http://www.cert.org/archive/pdf/attack_trends.pdf>.
Porras, P.A. et al., "EMERALD: Event Monitoring Enabling Responses to Anomalous Live Disturbances," Oct. 1997, Proceedings of the 20th NIST-NCSC National Information Systems Security (NISS) Conference.
Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.
Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.
Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ieff-idwg-requirements-07.txt>.
U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

SYSTEM AND METHOD FOR COORDINATING NETWORK INCIDENT RESPONSE ACTIVITIES

FIELD OF INVENTION

The present invention relates generally to methods and apparatus for reconfiguring network devices and more particularly to coordinating countermeasures to quarantine or mitigate and survive events affecting the security of a computer network.

BACKGROUND OF THE INVENTION

Benefits of the Internet and computer networking have followed Metcalfe's law, which states that interconnecting "n" number of devices results in "n" squared potential value. Expanding in value, networks are increasingly targeted by activists, criminals, terrorists, and military forces. Attacks are escalating in frequency and sophistication. Pandemic societal dependence on computer networks has heightened the repercussion of successful attacks.

An attack in the context of this invention includes any event and associated consequence(s) which can result in network disruption or compromise. Examples include but are not limited to physical phenomena such as vandalism, theft, fire, explosions, power failure; and cyber occurrences such as packet flooding, subverting a system for unauthorized activities, and unauthorized access to information.

Protection schemes are effective at defeating attacks that are manifested through predictable behavior and consequence. Protection schemes establish contingency courses of action before an attack takes place.

The traditional methodology for defending computer networks is deterministic, where a fixed security policy based on a protection scheme leveraging prevention and detection technologies is selected, then deployed. Security policies in these environments are often absolute, where network traffic of a given type is either permitted or denied, and change to policy is only implemented following approval from a centralized authority. This methodology is rigid and equivalent to the Maginot Line, where static defenses proved ineffective in an aggressive and rapidly evolving threat environment.

Restoration schemes are needed to defeat or mitigate attacks and consequences that are not predicted and/or allocated defensive resources. Restoration schemes facilitate an extensible recovery from attacks which bypass or overwhelm system defenses. Restoration schemes identify contingency courses of action during or immediately following an attack.

Survivable networks are considered attack tolerant, enabling continued operations while under attack. Information assurance is achieved by ensuring confidentiality, integrity, and availability. The general approach to building survivable networks and providing information assurance through innovations of the prior art has focused primarily on protection schemes using prevention and detection methods. The growing trend in successful cyber attacks against enterprise and service provider networks has proven that prevention and detection technologies are increasingly defeated and therefore incapable of providing absolute immunity to attack.

Deterministic methods do not scale nor adapt to change efficiently. Complexity and operating costs increase as new software patches, rule sets, attack signatures, and additional security controls are provisioned to prevent exploitation of potential vulnerabilities associated with maintaining and/or expanding the number of users, applications, and interconnections across a computer network. Complicating network predictability and contingency planning are non-static environments with a high rate of change as is prevalent with the advent of ubiquitous Internet accessibility, wireless connectivity, and mobile computing.

Any significantly complex, heterogeneous network of networks, such as the Internet, can survive and tolerate future attacks only if defended in a non-deterministic, probabilistic manner, where behaviors of the system are difficult to predict exactly, but the probability of certain behaviors is known. Instead of considering only the most likely situations, probabilistic approaches strive to compute a decision-theoretic optimum, in which decisions are based on all possible contingencies.

Deploying the most cost-effective defense-in-depth solution for network survivability requires a combination of centrally-managed and autonomous distributed security controls using a hybrid approach of both protection and restoration schemes implemented through a security model balancing prevention, detection, and incident response in accordance with the threat environment.

Warhol worms and other flash attacks have the potential to spread across the Internet and interconnected networks to impact every attached device and application within minutes or seconds. While many conventional solutions for attack prevention and detection have been developed, comparable emphasis has not been placed on incident response. The many possible settings for firewalls, intrusion detection devices, routers, switches, virus scanners and other devices and applications that affect security result in a complexity far exceeding the capability of individuals to make optimum decisions in anything approaching near-real-time. Many organizations rely on staff and contractors to manually implement incident response actions after an attack has impacted the operation of the network. Without an effective means to immediately contain suspicious behavior or resist an attack, events that circumvent preventive defenses often inflict substantial levels of damage between the time the detrimental activity is detected and the time by which countermeasures or contingency courses of action are implemented.

BRIEF SUMMARY OF THE INVENTION

In view of the problems present in the related art, it is a first object of the present invention to provide an Incident Response Action System (IRAS) that can facilitate and track incident response workflows and coordinate countermeasures in near-real-time to quarantine and/or mitigate and survive dynamic events affecting the security of a computer network.

It is a second object of the present invention to collect and accept Attack Event Targeting Information (AETI) from a plurality of input sources. AETI is data specific to a given attack which is used to identify the priority, source, destination, and/or consequence of the attack.

It is a third object of the present invention to collect and accept security capabilities and topology data for different and varied communities of network-attached devices and applications from a plurality of input sources.

It is a fourth object of the present invention to identify optimal countermeasures and/or contingency courses of action in a non-deterministic manner specific to AETI weighted against security capabilities and topology data known for varied communities of network-attached devices and applications.

It is a fifth object of the present invention to deploy countermeasures across a plurality of network-attached devices and applications specific to an in-progress attack.

It is a sixth object of the present invention to deploy countermeasures across a plurality of network-attached devices and applications specific to an attack believed to be imminent.

It is a seventh object of the present invention to remove countermeasures across a plurality of network-attached devices and applications specific to an attack that no longer presents a threat to the environment.

To achieve these and other objects, the present invention communicates with a plurality of varied and different input sources, network-attached devices and applications without requiring—although optionally supporting—a software agent to be loaded on these input sources, network-attached devices, and applications, and without requiring a prior deployment of devices throughout the network dedicated only to security enforcement.

BRIEF DESCRIPTION OF THE SEVERAL VIEWS OF THE DRAWING

A more complete understanding of this invention may be obtained from review of this specification in combination with the drawings, of which.

DETAILED DESCRIPTION OF THE INVENTION

The present invention will now be described more fully according to preferred embodiments. The invention may, however, be embodied in many different forms and should not be construed as being limited to the embodiments set forth herein. Rather, the embodiments are provided so that this disclosure will be thorough and complete, and will fully convey the concept of the invention to those skilled in the art.

Figure 1:
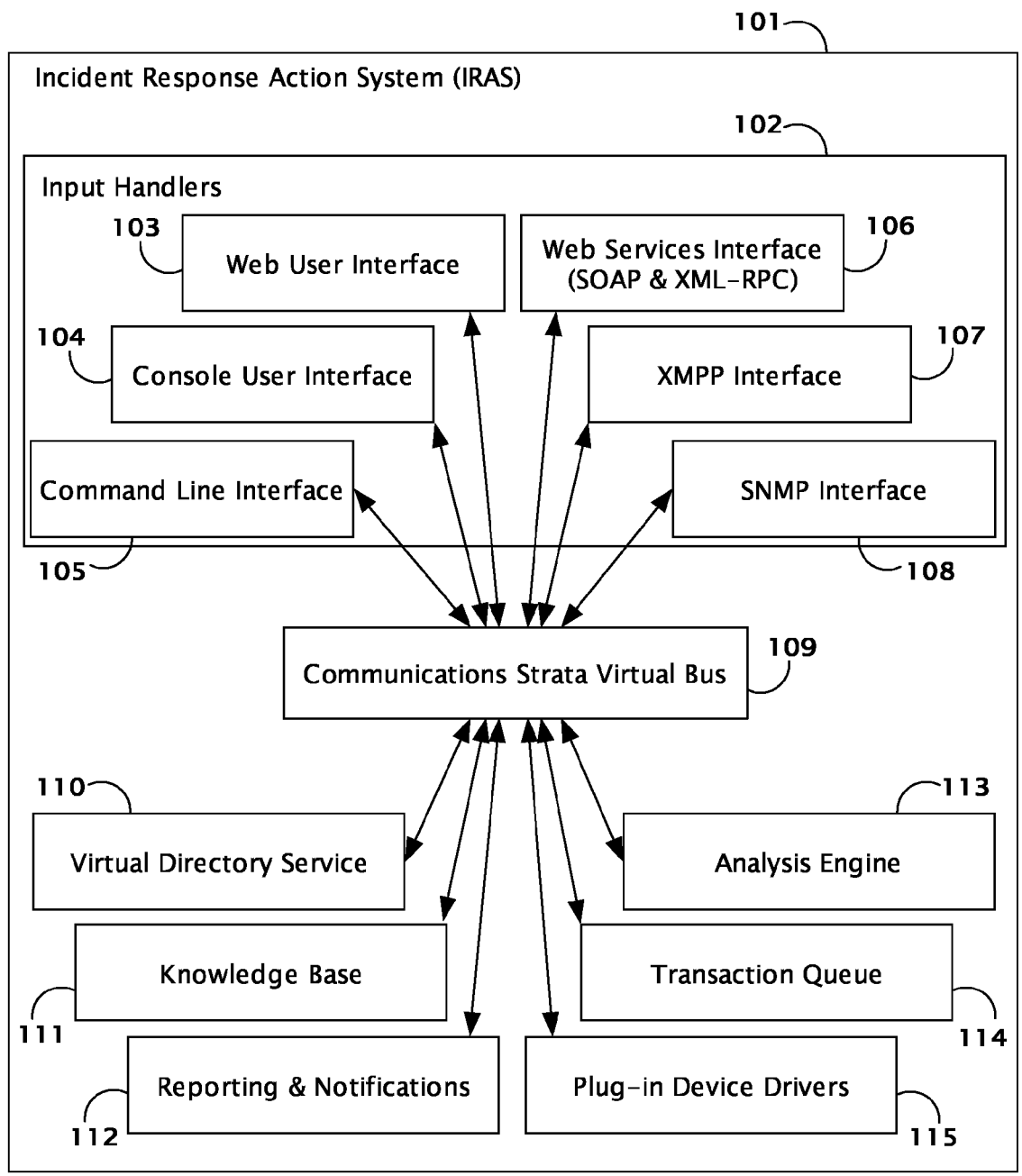
FIG. 1 is a diagram depicting the primary component architecture for an embodiment of the invention.

FIG. 1 is a diagram depicting the primary component architecture for an embodiment of the invention. The primary components are generally implemented in software. The relationship between each of the components is displayed in that each is capable of interfacing with the others through the communications strata virtual bus 109. The communications strata virtual bus facilities messaging passing between each of the primary components and enables the components to be deployed across disparate hardware platforms when needed for scalability and redundancy to meet the demands of managing hundreds to thousands of devices in large enterprise and service provider environments.

The purpose of the present invention is to enhance network operations by providing a comprehensive Incident Response Action System (IRAS) 101 built upon a highly available platform and combining the following primary components: input handlers 102 to accept Attack Event Targeting Information (AETI) from multiple input sources; a virtual directory service 110 for authentication and authorization of users, devices, and applications; a knowledge base 111 of network resources; a probabilistic analysis engine 113 and expert system; a near-real-time transaction queue 114; reporting and notification capabilities 112; plug-in drivers 115 for conducting agent-less reconfiguration tasks across network-attached devices and applications; and a communications strata virtual bus 109 which interconnects each of these components. These primary components and their architecture are depicted in FIG. 1.

The preferred embodiment is designed as an information warfare multiplier providing command and control to many virtual combat support systems of varied and different capabilities. IRAS 101 can be activated in either an autonomous, automated, or manually-directed manner to commandeer resources throughout the virtual landscape as needed to deploy countermeasures ensuring the survivability of the network even when traditional cyber security systems of the prior art may be failing or already defeated by one or more attacks.

IRAS 101 is designed for use during crisis specifically to support emergency operations. IRAS is best described operating on an orthogonal axis with respect to the general management plane associated with operational support systems, network-attached devices and applications within an organization. It is anticipated that the network-attached devices and applications that IRAS calls upon to support contingency courses of action are generally operationally managed by other methods and systems during routine operations.

National Institute of Science and Technology (NIST) Special Publication 800-61, Computer Security Incident Handling Guide, dated January 2004, identifies the incident response practice as having four steps as listed below:

(1) Preparation;
(2) Detection and Analysis;
(3) Containment, Eradication, and Recovery;
(4) Post-Incident Activity.

The preferred embodiment is designed primarily to support the last two steps of the NIST incident response recommended practice: Containment, Eradication, and Recovery, and Post-Incident Activity. Prevention and detection systems of the prior art generally support the first two steps: Preparation, and Detection and Analysis.

Figure 4:
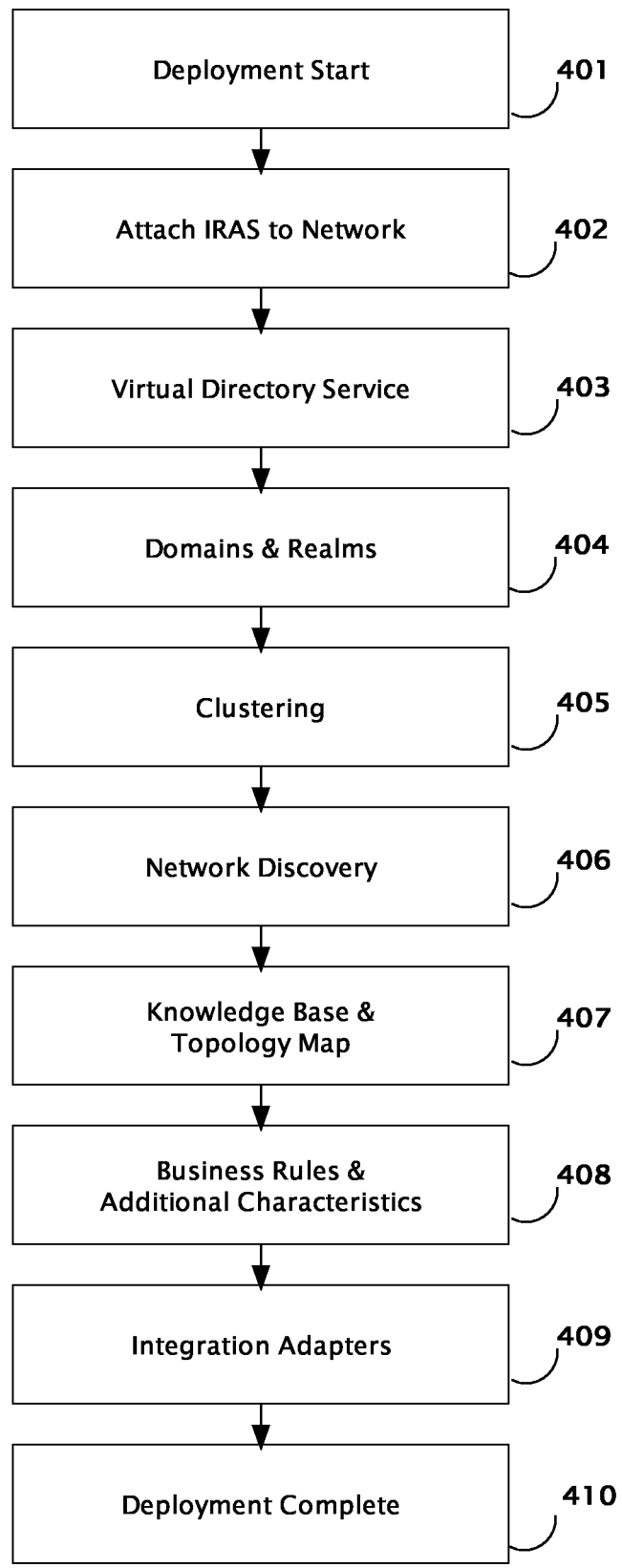
FIG. 4 lists the deployment sequence for an end-user to bring the invention into production within a network environment.

FIG. 4 lists the deployment sequence for an end-user to bring the invention into production within a network environment. The preferred embodiment provides a configuration wizard that assists the operator to accomplish many of the various steps required to accomplish a successful deployment. Attaching IRAS to the network 402 at a minimum involves assigning an available network address to the IRAS platform. Virtual directory services 403, domains and realms 404 provide for access controls and authorizations to grant end-user access to the different functions provided by the embodiment, and integrating the IRAS platform into existing access control systems available on the network. Clustering 405 is an optional step, used when deploying fault-tolerant and highly resilient implementations. Network discovery 406 is the most important deployment step, allowing IRAS to identify all of the devices on the network which it can control and their associated capabilities for incident response activities. Business rules 408 is an optional step allowing the operator to assign policy-based rules for IRAS to consider when determining which countermeasures can be used against a given attack. Integration adapters 409 optionally allow the IRAS platform to interoperate with existing security and network management systems on the network to provide additional capabilities for the organization.

The preferred embodiment is delivered as a hardened, purpose-built appliance, combining both hardware and software in a single product, which is then attached 402 to an organization's network. In an alternative embodiment, IRAS 101 is delivered as software which can be rapidly brought online using an existing network-attached platform without requiring permanent installation through the use of a bootable Live-CD, Live-DVD, Compact Flash, USB Storage Device, or other portable media or electronic device. In a further alternative embodiment IRAS is delivered as licensed technology for use embedded within a larger solution.

The preferred embodiment includes various built-in cyber security controls designed to safeguard the confidentiality, integrity, and availability of the IRAS 101 runtime environment. These host-based protections may include an internal firewall, intrusion prevention/detection, and anti-virus functions, in addition to other defenses. Each built-in security service records activities to the IRAS event and audit logs and may be configured to generate notifications and/or trigger self-defense actions if the IRAS platform comes under direct attack.

The preferred embodiment uses the Advanced Encryption Standard (AES) algorithm to encrypt all passwords and other sensitive data stored in the database. No clear-text passwords are stored on IRAS 101 permanent storage media, to include flash memory, hard disk drives, and optical discs. In an exemplary embodiment the encryption software library can be easily field-upgraded as improved algorithms are developed.

IRAS 101 includes a built-in function that can be exercised by an administrator to purge all operational data, returning an instance to the factory-default or initial state. In some embodiments IRAS provides a failsafe function for zeroing encryption keys and other sensitive information automatically when any of the built-in security services detect a system or platform compromise.

Figure 2:
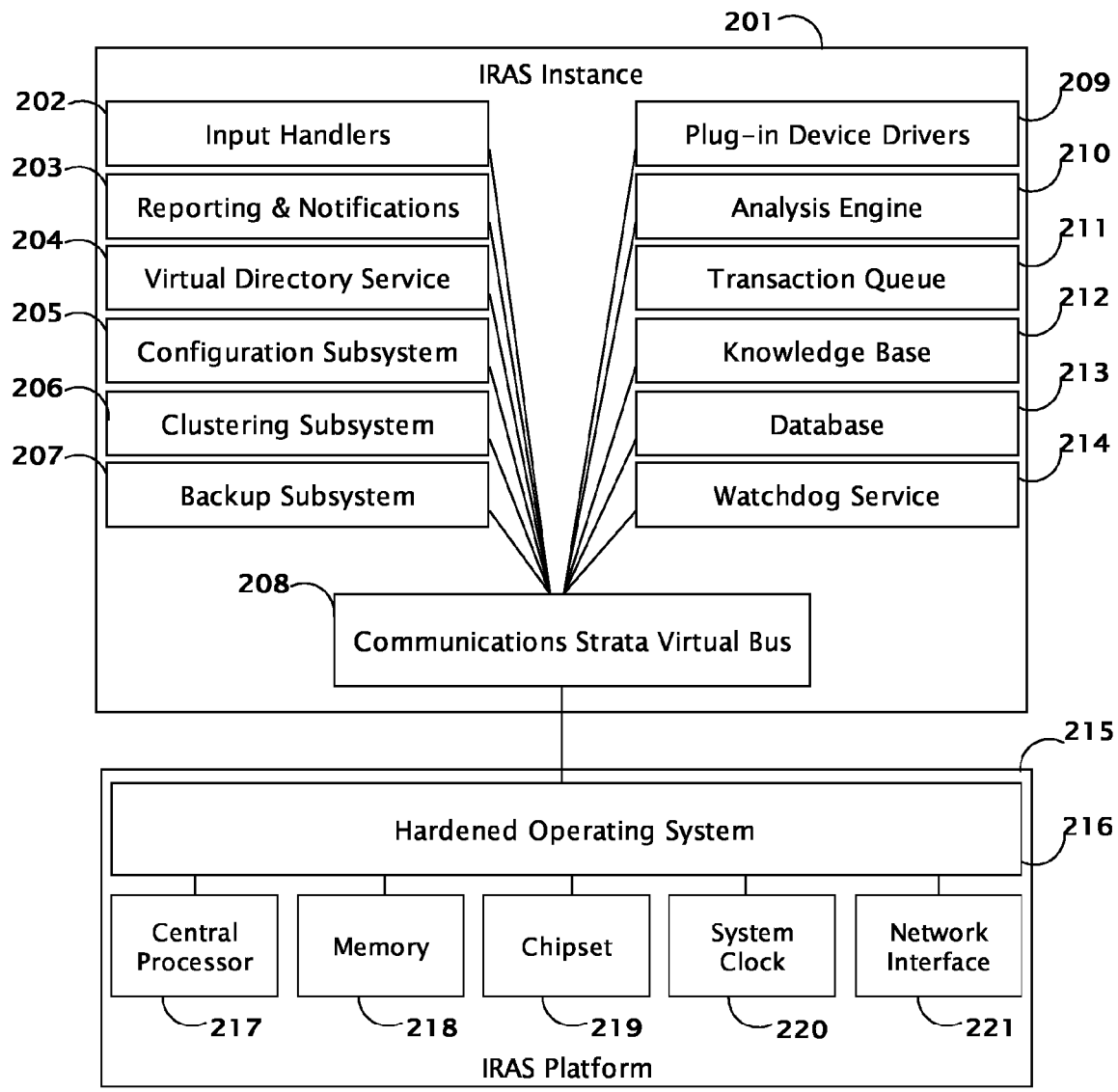
FIG. 2 is a diagram depicting the underlying hardware in addition to the primary components and supporting software elements for an embodiment of the invention.

FIG. 2 is a diagram depicting the underlying hardware in addition to the primary components and supporting software elements for an embodiment of the invention. This diagram shows the division between a logical instance of software 201 running on a platform 215 that consists of an operating system 216 and physical hardware 217, 218, 219, 220, 221. Here the communications strata virtual bus 208 maps function calls and data flow between the primary components (input handlers 202, reporting and notifications 203, virtual directory 204, device drivers 209, analysis engine 210, transaction queue 211, and knowledge base 212) and supporting software elements (configuration subsystem 205, clustering subsystem 206, backup subsystem 207, database 213, and watchdog service 214). For maximum deployment flexibility, the preferred embodiment allows deploying each of the primary components and supporting software elements across one to many hardware platforms. The present invention comprises this complete combination of hardware and software when used together.

Each IRAS instance 201 is composed of multiple input and output interfaces; an integrated database 213 to support the internal directory service 204, knowledge base 212, transaction queue 211, and reporting functions 203; and various supporting back-end processes including a watchdog service 214 which provides self-monitoring to restart any individual process upon failure. IRAS also includes a library of plug-in device drivers 209, generic templates, and supplementary software tools for use with discovering and controlling varied and different network-attached devices and applications. These underlying elements are depicted in FIG. 2.

Figure 3:
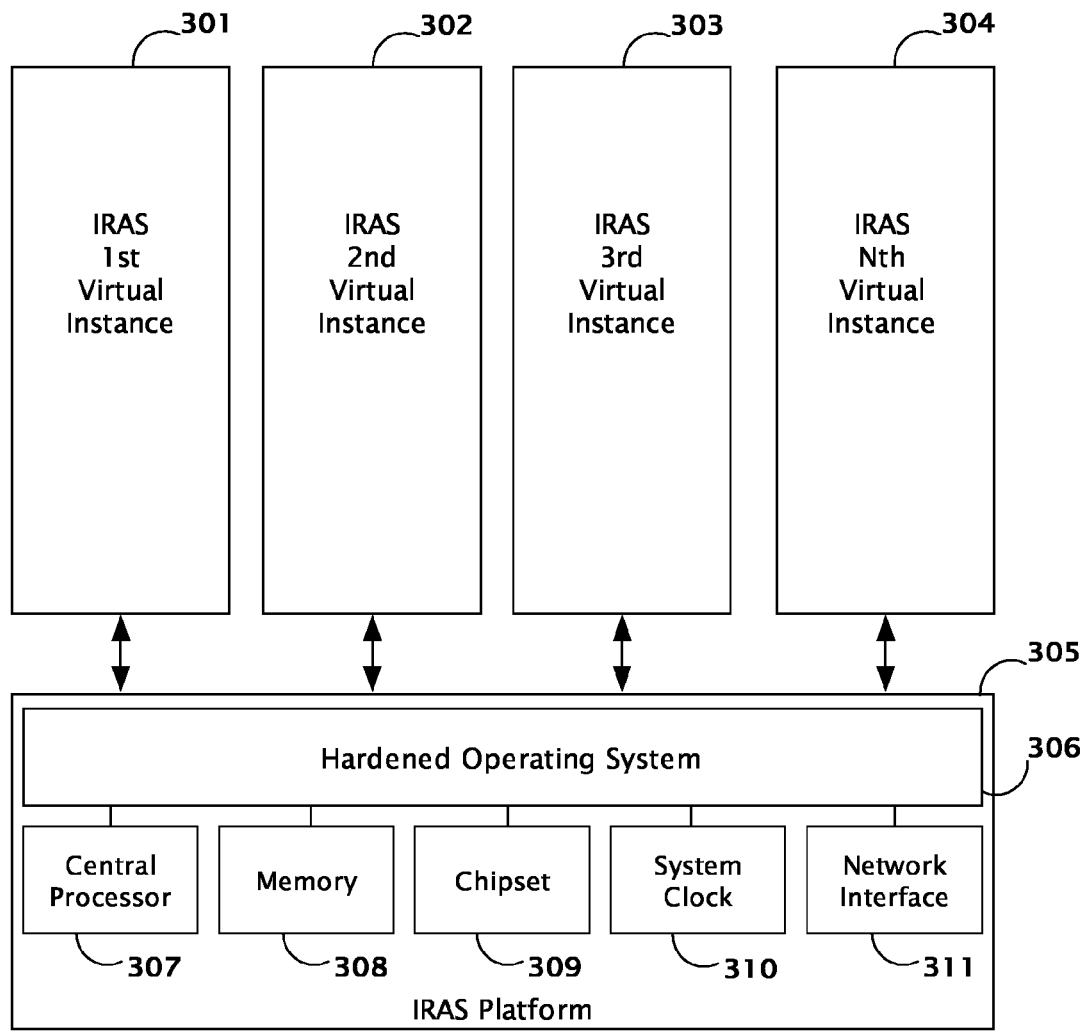
FIG. 3 is a diagram depicting multiple virtual instances of software running on a single platform.

FIG. 3 is a diagram depicting multiple virtual instances of software 301, 302, 303, 304 running on a single platform 305. Just as the invention can be deployed across multiple platforms in one embodiment, the invention can also operate where multiple instances are deployed to a common hardware platform. Virtualization is especially valuable when an organization is seeking to use the embodiment to support multiple customers as is often needed for service providers managing a network of networks.

The preferred embodiment optionally supports a plurality of virtual IRAS instances 301, 302, 303, 304 simultaneously running on a singular set of hardware or common platform 305 as depicted in FIG. 3. Multiple instances allow for clear delineations with respect to operational authority and risk avoidance where both the administrator and operational functions of a given IRAS instance can be configured to have no implicit access whatsoever to another instance's operational functions and data.

The preferred embodiment includes a built-in data backup function which can transmit an encrypted backup image of IRAS operational data in accordance with an optional schedule and also on-demand when directed by an administrator. In the event an IRAS instance fails during operation, the previous state can be restored to either the original, new, or another known-good IRAS platform or virtual instance by restoring the backup image and encryption keys.

To support system tests, post-incident forensics analysis, and war-gaming "what if" scenarios, the preferred embodiment supports point-in-time checkpoints and immediate rollback to a previously created checkpoint, restoring the operating state of an IRAS instance to a specific moment in time. An administrator can set IRAS to establish a point-in-time checkpoint on-demand, by schedule, or upon triggered event. Each checkpoint represents a full system backup of the IRAS instance, created near instantly using local storage and snapshot technology. The built-in backup function uses a checkpoint image to perform backups while the system continues to operate non-stop, requiring only a momentary pause in IRAS transaction processing.

In addition to the built-in backup and point-in-time checkpoint functions, the preferred embodiment may be set to spool all activities to a journal. By default, the journal is used to maintain a copy of all transactions and changes within an IRAS instance starting from the last full system backup or checkpoint, keeping a record of all change until the next full system backup or checkpoint is completed. If needed, an instance can be restored first using the last available backup or checkpoint, and second using the journal. Optionally, the journal can be used separate of the backup and checkpoint functions in a cyclic mode, where an administrator sets the journal to track the last "n" changes. Under both the default and cyclic modes of operation, the journal enables an administrator to review, undo and replay each action processed within an instance that are currently recorded within its journal.

The preferred embodiment supports optional high-availability implementations where multiple IRAS instances can be configured to operate as a cluster 405, with three clustering modes:

(1) Failover clustering;
(2) Distributed computing clustering;
(3) Loosely coupled clustering.

In the first clustering mode (failover clustering), two or more instances are joined in a configuration for failover where one instance operates as the primary/active node, while the secondary and any additional instances operate in standby, ready to assume the role of the primary node in the event of failure. With failover clustering each instance is assigned a succession value that identifies which instance will operate as the primary node. Failover clustering is configured as either stateful or non-stateful. Stateful failover generally requires low latency data exchange between nodes given that all changes and transactions aren't marked as complete until each action is replicated across all instances. Non-stateful failover periodically replicates changes and transactions in batch mode across all instances, alleviating minimum latency requirements.

In the second clustering mode (distributed computing clustering), any number of instances can be configured for load-balancing using distributed and parallel computing techniques, where one or more nodes perform load-distribution across the remaining nodes in the cluster. In this distributed computing clustering mode, failover clustering can also be applied across load-distribution nodes to provide a chain of succession in the event an individual load-distribution instance fails.

In the third clustering mode (loosely coupled clustering), any number of nodes can be assigned to participate in a loosely coupled cluster where multiple IRAS instances are configured to share a common object-oriented data cache. When operating in this mode, objects within the shared cache are replicated across all nodes within the cluster. Each object in the shared cache has an assigned owner, where all nodes are granted read access to the object, but only the node assigned as owner possesses write access to the object. Each node manages data exchange between its internal databases and the shared cache using a cluster relationship matrix which maps objects for import, export, or no action between the internal database and the shared cache.

The preferred embodiment provides a virtual directory service 204 for storing user and system authentication credentials, access rights, and meta data specific to the operation of each IRAS instance. The virtual directory is comprised first of an internal directory that supports the IRAS-specific role-based, hierarchal access control model, and second facilitates access to any required external directory services. The directory structure allows for access control lists, roles, objects and containers. Access control lists and roles equate to permissions; objects may define users, devices, functions, and applications; and containers may consist of grouped objects and/or grouped containers. Permissions can be applied to any object or container.

IRAS supports interoperability with a plurality of external directories where credentials submitted by an input source or other mechanism can be authenticated against either the internal directory or one or more external systems. All communication between the IRAS virtual directory and any external directory is performed using a directory connector construct which requires a device driver for the external directory service and a directory relationship matrix. The directory relationship matrix is used to map, filter, and translate data for proxy, import, export, or no action between directories. The preferred embodiment provides directory device drivers to interoperate with other IRAS instances, Lightweight Directory Access Protocol (LDAP), Remote Authentication Dial-In User Service (RADIUS), Terminal Access Controller Access Control System (TACACS+), Network Information System (NIS) Yellow Pages, and Microsoft Active Directory services.

IRAS can be configured to perform automatic directory synchronization across multiple instances. Instances are assigned to a domain 404. Instances may be members of only one domain. By default, an independent instance is a member of its own domain, and all instances within a failover cluster or distributed computing cluster are members of the same domain. Directory information is replicated across all instances within the same domain, enabling centralized directory management without requiring a centralized directory. Directory replication between instances is implemented as a special type of loosely coupled clustering.

IRAS optionally supports a hierarchal implementation of one and two-way trusts through the use of realms 404. A realm is used to establish trust relationships between domains where administrators of different domains jointly establish access to functions and resources within one domain from another. Shared access can be granted to specific actions and objects, limited by roles and access control lists. Trusts are identified by realm, domain, function, and resource. Domains may join multiple realms and a realm may consist of multiple trusts. A first domain that is trusted can access shared functions and resources as defined by the trust relationship in a second domain which is trusting. Trusts are limited to realm boundaries, which prohibits a trusted domain from accessing resources or functions available within a trusting domain but which aren't assigned to the specific realm identified in the trust relationship.

Given the appropriate trust relationships, both peered and hierarchal organizations can be established for domains within realms. In one example all domains in a realm are peered and allowed to share reporting information between domains. In another example many domains are subordinated to a master domain which is granted access to all available countermeasures within the given realm.

The flexibility provided through the use of clustering, directory interoperability, domains, and realms enables IRAS to meet the varied operational control requirements present within many customer organizations.

Intelligence is a key component of information warfare. IRAS assists an organization with situation awareness by providing reporting and graphing capabilities to review all active and past countermeasure activities and AETI. The ability to visualize the virtual landscape using an overlay of the impact from deployed countermeasures across the network topology is a powerful tool serving both tactical and strategic cyber defense planning. IRAS incident reports, maps, and trend analysis graphs facilitate subsequent security assessments and follow-up forensics investigations.

The preferred embodiment provides a built-in incident handling system which provides template-based incident reporting, ticketing, escalation, and notifications. Varied and different templates can be established within IRAS to suit custom reporting and notification requirements. Report and notification formats support the previously largely human-intensive dimension of the prior-art incident handling process. Both automated and manually-developed incident reports can be generated and maintained by the system and sent on-demand, by schedule, and based upon a triggered event using a variety of output methods to a plurality of destinations.

The preferred embodiment supports Extensible Markup Language (XML) message input and output. IRAS supports requirements for the Application Vulnerability Description Language (AVDL), Incident Data Exchange Format (IODEF) Data Model and Format for INcident information Exchange (FINE). IRAS is designed to transmit and receive scheduled and on-demand summary and detailed reports to/from subordinate, adjacent, higher and external organizations as needed to meet customer requirements, especially within the United States Federal government and Armed Forces.

IRAS provides a web-based user interface 103; a command line interface 105; a local console interface 104; and a plurality of extensible application programming interfaces available through multiple protocols. IRAS includes each of these interfaces for accepting input and presenting output.

The preferred embodiment supports a variety of electronic communications from multiple input sources which are capable of providing an alert. Supported input sources include but are not limited to automated or manual operator input via the web-based user interface 103, command line interface 105, or console interface 104; receipt of an alert via an application programming interface; receipt of an alert via one of the IRAS supported communication protocols; receipt from a configured-pull subscription service; and/or receipt from a configured-push subscription service.

IRAS supports two forms of subscription service, push and pull. Push subscription services are data feeds from one or more external sources that push updates to IRAS. Pull subscription services are data feeds that an IRAS instance pulls from one or more external sources.

IRAS can optionally be configured per subscription service as a proxy or gateway where an organization with multiple IRAS instances can configure one or more downstream IRAS instances to exchange subscription content through one or more proxies and/or gateways. An IRAS proxy will exchange data with subscription sources on behalf of downstream instances, aggregating content and optionally masking the identity of downstream instances. When operating as a gateway, IRAS will relay data with subscription sources for downstream IRAS instances, where downstream IRAS content is not aggregated nor identity masked—as is often required to support the end-to-end encryption and authentication demands of a given subscription service provider.

In the preferred embodiment, caching and time-shifting are available options for use with the IRAS subscription proxy, where subscription content is buffered at the proxy to allow asynchronous bidirectional communication between the subscription service and proxy, and the proxy with downstream IRAS instances. Caching enables the proxy to optionally aggregate content exchanges in either or both directions, where "n" exchanges with a given subscription service are reduced to fewer than "n" exchanges with downstream instances, and vice versa.

Some embodiments provide optional filters that can be associated with specific input and output sources and data exchange actions, to include trust relationships, cluster and directory relationship matrices, and subscription services. IRAS provides a macro and regular-expression rule base for applying filters. Filtering can be used as a security control with respect to data exchange, limiting which data to/from a given source is permitted and/or excluded. Filtering can also be used to assign priorities to the types of data received and transmitted. Filtering can be configured and applied at varying levels from specific data exchange activity to a given instance, domain, trust, and realm.

Supported output methods for notifications, incident reports, and other information include but are not limited to the web-based user interface 103; command line interface 105; local console interface 104; Simple Network Management Protocol (SNMP) traps 108; System Log (SYSLOG) events; directed document upload and download; email; instant messaging; pager; fax; voicemail; and telephone. These notifications can be directed at external notification systems, external management systems, and users based on triggered events.

IRAS supports a number of communication protocols which allows for interoperability with varied and different external systems. Example protocols which can each be optionally enabled by the administrator include but are not limited to: Rsync, Telnet, Secure Shell (SSH), Secure Copy (SCP), SNMP, File Transfer Protocol (FTP), Trivial File Transfer Protocol (TFTP), Hyper Text Transport Protocol (HTTP), Secure Hyper Text Transport Protocol (HTTPS), Simple Object Access Protocol (SOAP), Extensible Markup Language Remote Procedure Call (XML-RPC), Domain Naming System (DNS), Border Gateway Protocol (BGP), Open Shortest Path First (OSPF), and Real-Time Inter-Network Defense against Denial of Service (RID DoS).

Figure 6:
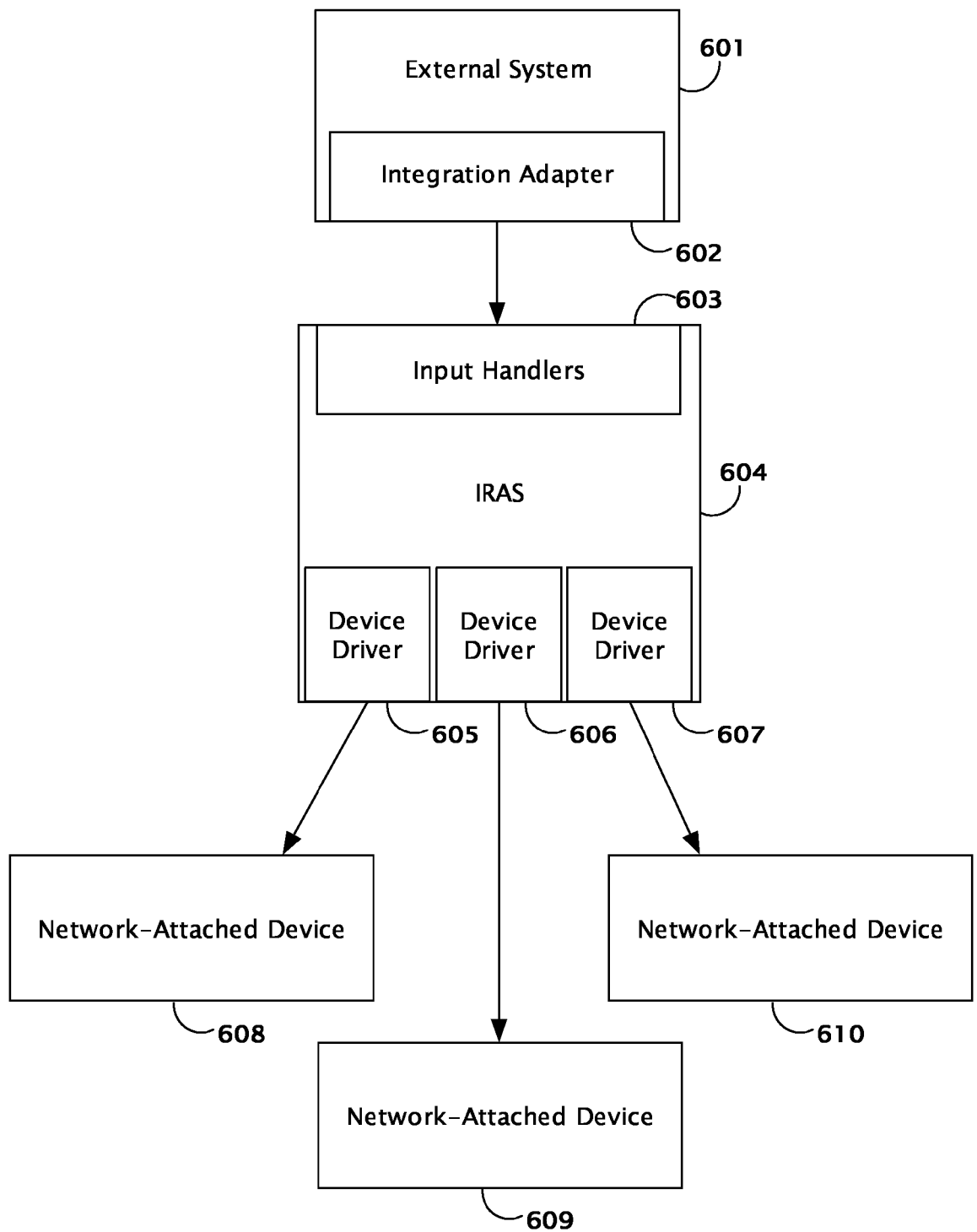
FIG. 6 displays the relationship between device drivers that plug-in and execute within the context of IRAS to enable management of network-attached devices and applications, and integration adapters which optionally provide seamless interoperability with the invention from within the context of external systems.

FIG. 6 displays the relationship between device drivers 605, 606, and 607 that plug-in and execute within the context of IRAS 604 to enable management of network-attached devices and applications 608, 609, and 610, and integration adapters 602 which optionally provide seamless interoperability with the invention from within the context of external systems 601.

IRAS supports a variety of integration adapters 602 for use with external systems 601. Integration adapters act as middleware between external systems and IRAS 604. Integration adapters provide a bridge between the native methods of external systems with the supported IRAS communication protocols and application programming interfaces. Integration adapters are primarily used to tie together input and/or output sources between IRAS and external systems, enabling in one example automating alert transmission from an external system into IRAS, and providing reporting feedback back to the external system after IRAS completes processing activity associated with the given alert. The preferred embodiment will provide optional integration adapter software for external systems such as firewalls, intrusion prevention and detection systems, security information management systems, vulnerability management systems, network management systems, enterprise management systems, virtual private network gateways, managed security monitoring sentries, help desk ticketing systems, customer relationship management systems, and other incident handling systems. The relationships between IRAS and external systems through the use of integration adapters and device drivers are displayed in FIG. 6.

IRAS can be actively monitored via SNMP for use with external management systems, and a documented Management Information Base (MIB) is provided for externally tracking and establishing thresholds for IRAS-specific activities.

The preferred embodiment supports Extensible Messaging and Presence Protocol (XMPP) 107 as one means of exchanging data and command structures natively between IRAS instances through the use of data streams. XMPP is a general purpose protocol not limited to its origins with instant messaging and presence and uses XML as the syntax for its protocol elements. IRAS instances can be configured as either server or client nodes with respect to XMPP. XMPP streams are unidirectional, so bidirectional communication requires two separate streams. XMPP as implemented within IRAS is configured to support Simple Authentication and Security Layer (SASL) for authentication and Transport Layer Security (TLS) for encryption.

The preferred embodiment supports automatic and assisted discovery 406 of network-attached devices, applications, and other IRAS instances. IRAS accepts authentication credentials for accessing the devices, applications, and other IRAS instances during discovery and supports using previously provided values stored in the knowledge base referenced using macros.

Automatic discovery is performed using a variety of optionally enabled techniques, to include ping sweeps, trace routes, port scans, SNMP inquiries, attempted HTTP and HTTPS access, attempted telnet and SSH login, and interrogating previously discovered devices and applications for information regarding neighboring devices. Automated discovery can be restricted by network Internet Protocol (IP) address ranges and/or device or application types.

Assisted discovery allows the operator to provide a list of one or more device or application management IP addresses and optionally identifying the specific device or application type for each management IP address. Assisted discovery also supports importing device and application settings from a variety of data file types, external management systems, other IRAS instances, IRAS backup archive files, and additional data sources through the use of an included data import and mapping tool.

IRAS optionally supports recurring and on-demand device and application re-discovery and configuration polling to ensure settings maintained in the IRAS knowledge base reflect the current state of the environment. An exemplary embodiment supports recurring synchronization of the IRAS knowledge base with a plurality of network and security management systems through the use of optional integration adapters.

IRAS optionally supports accepting device or application settings and/or authentication credentials embedded within electronic communications from input sources providing an alert.

Deploying countermeasures against an attack may have a negative impact on business operations. The preferred embodiment allows an organization to input a list of network address ranges, host addresses, hostnames, protocol and application attributes, scheduling timeframes, and known-safe AETI to ensure IRAS does not accidentally or by design deploy a countermeasure against a mission-critical business application without sufficient approval authority and/or a manual override. These policy-based rules are in addition to macro and regular-expression filtering capabilities.

Figure 5:
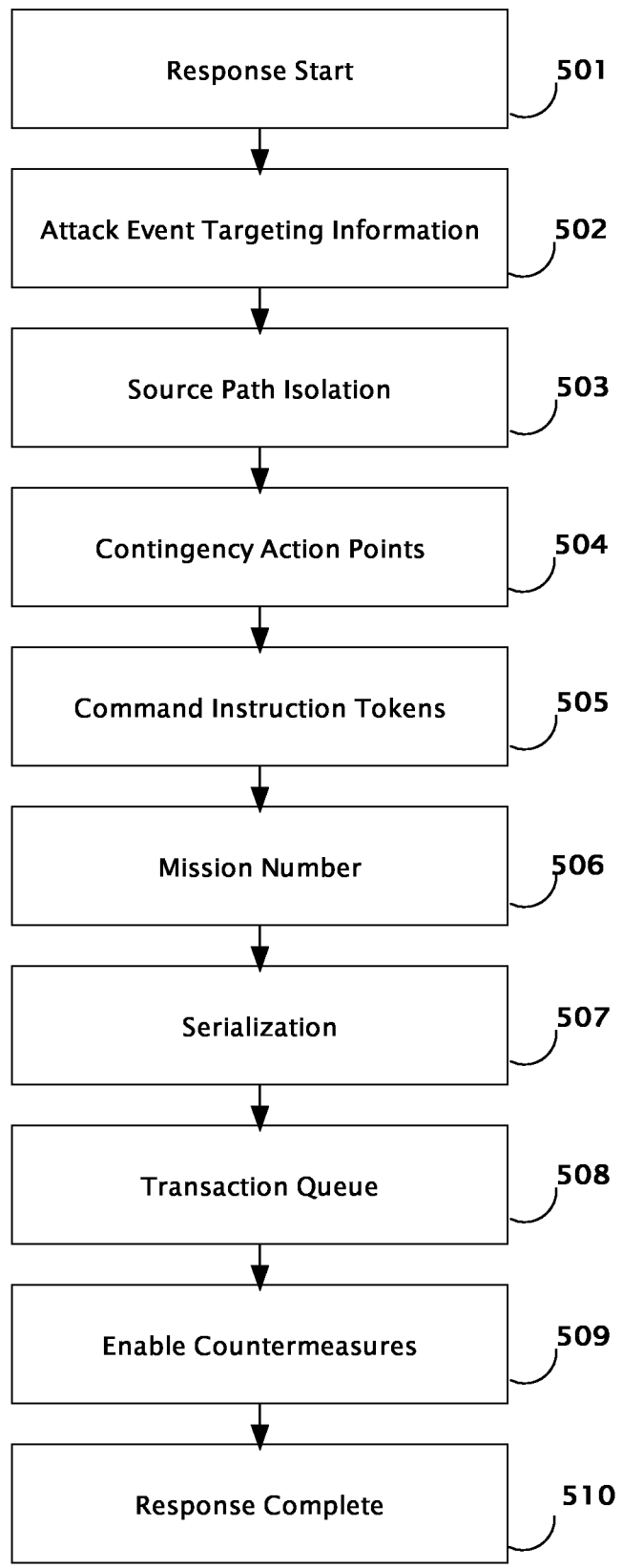
FIG. 5 lists the operations sequence for a user to exercise the primary function of the invention—deploying network countermeasures in response to a network attack.

FIG. 5 lists the operations sequence for a user to exercise the primary function of the invention—deploying network countermeasures in response to a network attack. Users of the invention for incident response begin 501 by inputting AETI 502 into IRAS which can be accomplished either manually by an operator, or automatically from another system on the network. IRAS then performs source path isolation 503 to select a subset of devices specific to the attack and available countermeasures. This subset is then reviewed for contingency action points 504 to identify the most effective countermeasure(s) for deployment. Command instruction tokens 505 are then generated and a mission number 506 is assigned. Serialization 507 is performed to avoid race conditions where multiple actions on the same device could cause conflict. All activities are processed through the transaction queue 508 to enable countermeasures 509. An incident report is automatically generated when the response activity is completed 510.

IRAS accepts AETI 502 in a variety of alert formats. Data which can be provided in an alert may include addresses described as an individual hostname or host address, a Classless Inter-Domain Routing (CIDR) network address with mask, or a delimited list of individual hostnames and/or host addresses and/or CIDR network addresses with masks. IRAS accepts any, all, or some combination of the following network characteristics specific to an attack: start, stop, and duration timeframes; packet count; IP protocol number; source IP address; destination IP address; IP or higher level protocol packet header attributes; regular expressions for packet payload signature; and application-specific values associated with select applications and protocols.

IRAS assigns a priority value to each received alert. This priority value may be weighted according to a number of different criteria, to include but not limited to the identity of the originating source, what priority value the originating source requested, date and time the alert was received, and specific AETI attributes. The priority value assigned to each alert is used throughout IRAS processing to influence the sequence in which alerts are handled.

IRAS supports two operating modes for processing alerts received from any specifically-assigned input source or group of sources: autonomous or assisted. In autonomous mode IRAS will parse each received alert from the given input source and automatically execute an action if applicable. In assisted mode, which is the default, IRAS will hold each received alert in the transaction queue awaiting either approval or rejection from either policy-based rules which are applied to all queued transactions at regular intervals, or review and decision from an operator or administrator with sufficient rights to review and approve or reject the specific alert.

The preferred embodiment supports workflow rules for queued transactions, where higher approval can be optionally required for alerts or other events that match a specific filter, which are submitted by a specific operator, etc. Workflow behaviors also support automated escalation and notifications for triggered events that match specific rules. Workflow behaviors can be established to modify the priority value assigned to an alert, or sequence of alerts.

The preferred embodiment uses a knowledge base 111 to track the current state and connection relationships of available network resources, all policy-based rules and workflow definitions, filters, macros, and a plurality of additional values required to support IRAS operations. This knowledge base is primarily comprised of information gathered during network-attached device and application discovery, configuration and status polling, data received via subscriptions, received alerts, past and currently deployed countermeasures, and information provided by the IRAS administrator.

The preferred embodiment uses a probabilistic analysis engine 113 and expert system to review alerts in context with data within the knowledge base to first perform Source Path Isolation (SPI) 503, second to identify Contingency Action Points (CAP) 504, and third to assemble Command Instruction Tokens (CIT) 505 which are processed within the IRAS near-real-time transaction queue as child transactions to the parent alert transaction.

Source Path Isolation (SPI) 503 is a function which dynamically identifies a candidate set of devices and applications from the available network topology which are relevant based on AETI characteristics. IRAS benefits from SPI by reducing the number of devices and applications that must be further reviewed to determine which countermeasures are required against a given attack. In a first example, SPI identifies border devices specific to an attack sourced outside the topology. In a second example, SPI identifies all devices along each logical path from source to destination of an attack which transits through the topology. In a third example, SPI identifies all devices within the topology which are vulnerable to a specific attack.

IRAS generates the Contingency Access Points (CAP) 504 candidate coordination list through a review process that considers each device and application identified by the SPI function. This analysis determines the most effective set of countermeasures against an attack using the current state and availability of security capabilities for each device and application. The CAP list may be weighted based on asset value, damage assessment, potential business impact, and other factors. One or more CAP assignments may be made per device or application. In the event IRAS is unable to identify a countermeasure to quarantine and/or mitigate an attack, an error message is generated and a default action and/or notification can be performed based on settings defined by the administrator.

The probabilistic analysis engine and expert system assigns a globally unique id for each CAP. This globally unique id is used as a reference pointer for each CAP, mapped to a specific countermeasure at a specific device or application within the topology. Through the use of the unique id, each CAP can be managed individually if required, to include transaction grouping, replay, rollback, extending duration, and reporting.

When the probabilistic analysis engine and expert system has finalized the CAP list, Command Instruction Tokens (CIT) 505 are assigned for each CAP. CIT represent the action required for each CAP. The probabilistic analysis engine and expert system then submits the CAP list with CIT assignments to the transaction queue which assigns a mission number 506. During submission, the CAP list and CIT assignments may be divided into multiple transactions, generally using one parent transaction for the mission and one child transaction per CAP/CIT assignment in the list. Transaction relationships are maintained for each mission, where a plurality of child transactions may be associated with one or more parent transactions.

Transactions are processed and tracked through the near-real-time transaction queue 508, where this queue acts as the primary mission scheduler for each IRAS instance. The transaction queue uses a serialization function 507 to ensure all transactions are evaluated serially across a given device, ensuring that IRAS can communicate with multiple devices concurrently in parallel, but will only communicate with any specific device in a serial manner to avoid potential race conditions between multiple transactions which act upon the given device.

All transactions have an assigned priority, timestamp and state which are then reviewed and updated as each transaction passes through the queue. IRAS handles the queue using a collection of multitasking processes which divide the current number of transactions in the queue into sets, where each set is ranked based on priority, time-sensitive requirements measured against true wall clock time, and transaction state. In the event of a tie within a set, or by default given no other requirements, transactions are processed in a first-come, first-served manner.

For each transaction associated with a network device 608, 609, 610 or application, IRAS 604 performs the device-specific aspects of the transaction through a device driver 605, 606, 607 which is designed to query and/or modify the given network device type and/or application version.

IRAS 604 supports varied and different communities of network-attached devices 608, 609, 610 and applications through the use of extensible plug-in device drivers 605, 606, 607. The preferred embodiment is designed to interoperate with existing and future heterogeneous network-attached devices and applications, leveraging both existing and future resource investments associated with the operation of the network environment. IRAS enables an existing investment in virtual deterrence to evolve toward supporting a self-defending network.

Device drivers 605, 606, 607 can be added to and removed from an IRAS instance 604 as the models and versions of network devices 608, 609, 610 and applications within an organization's network change over time. With some embodiments, an IRAS vendor may only provide and support drivers for a limited range of network device models and application versions, where end-users may develop custom drivers to manage any additional device types. In the preferred embodiment, third-parties may publish open-source and/or proprietary device drivers, making these additional drivers available on the open market, or bundled within value-added IRAS bundles. New drivers may be released to provide additional functionality within the IRAS application.

Device drivers 605, 606, 607 translate IRAS transaction syntax for each CIT into device-specific communications and command instructions. Device drivers are used to execute instructions within the context of the network device 608, 609, 610 or application associated with the given transaction, collect and parse the response messages from each instruction, and provide feedback back to the IRAS transaction queue.

Figure 7:
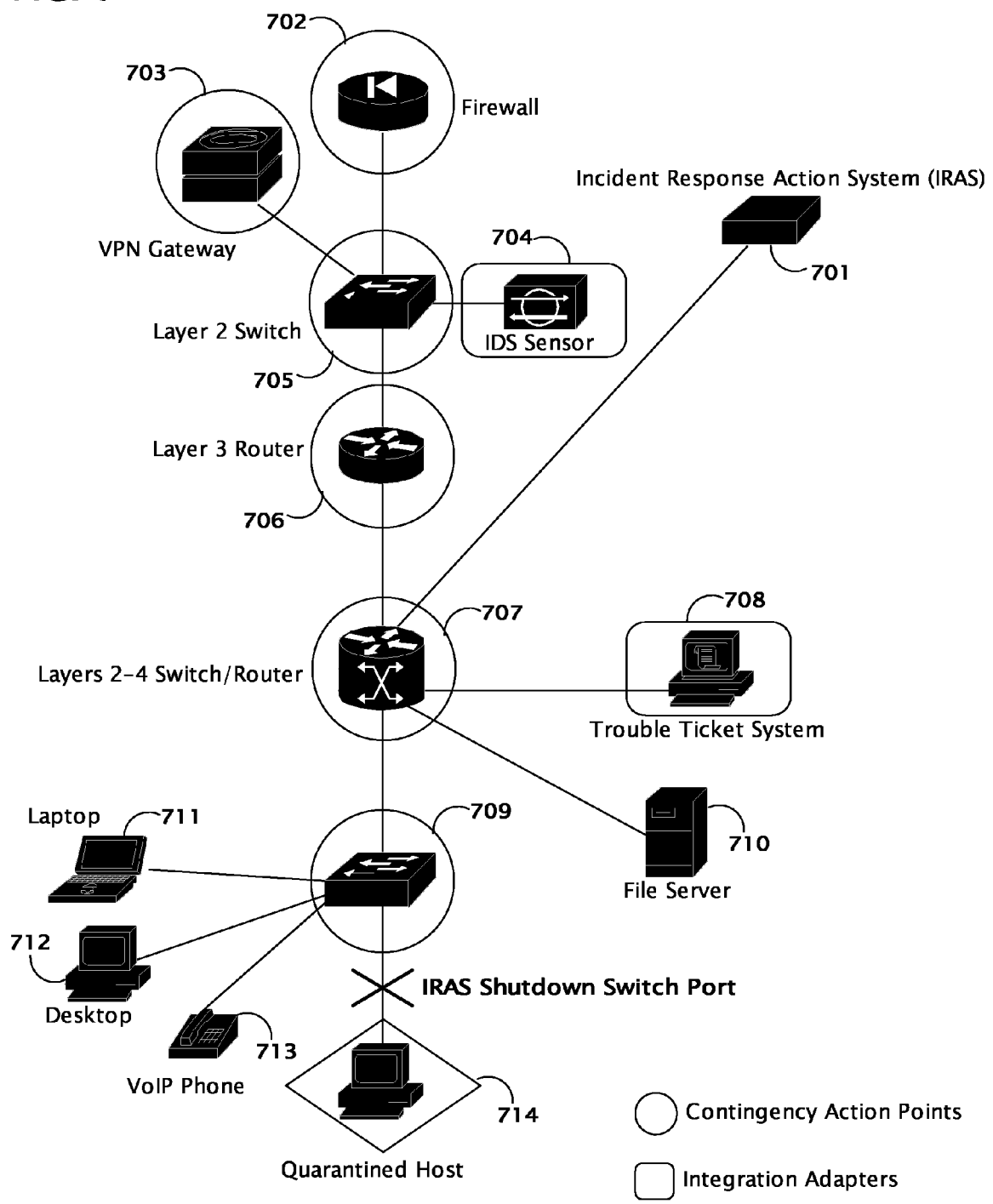
FIG. 7 is an example diagram depicting a partial network topology where IRAS has shutdown a LAN port at an edge switch to quarantine an infected workstation.

FIG. 7 is an example diagram depicting a partial network topology where IRAS 701 has shutdown a LAN port at an edge switch 709 to quarantine an infected workstation 714. In this example, the IDS sensor 704 detected packets matching the signature for worm propagation outbound to the Internet through the firewall 702. The IDS 704 transmits an alarm with the source IP address of 714 to IRAS using an integration adapter. IRAS immediately polls the managed network devices to locate 714 and finds the MAC address associated with the IP address for 714 in the forwarding tables of the switches 707 and 709. IRAS identifies that 707 is upstream of 709, and that 709 is directly connected to 714. To counter the attack of worm propagation from 714 out to the Internet, IRAS reviews each contingency action point along the path and deploys the most effective countermeasure closest to the threat source by instructing the switch 709 to shutdown the access port connecting 714. Start to finish, this scenario takes only a few seconds. After the infected host is quarantined, IRAS generates an incident report and, through a second integration adapter, automatically generates a trouble ticket for the organization's help desk staff to perform remediation. When remediation is complete, the help desk staff close the ticket, triggering IRAS to automatically instruct switch 709 to re-enable the access port.

In summary, the preferred embodiment is designed to on-demand dynamically focus all applicable security capabilities within a community of varied and different network-attached devices and applications to counter an attack, and to stand-down those countermeasures when the attack no longer presents a threat, expires, or is removed via manual override. Optionally, countermeasures can be handed-off as security policy updates via integration with external security management systems, network management systems, and/or enterprise management systems. The preferred embodiment is designed for use primarily during crisis operations.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A computer-implemented method for responding to an attack that occurred on a computer network, comprising:
   receiving a description of the attack that occurred;
   accessing a description of a topology of the network;
   determining, based on the attack description and the topology description, one or more devices or applications that are relevant to the attack that occurred;
   determining, based on the one or more relevant devices or applications, a first set of actions that can be executed to respond to the attack that occurred;

automatically determining, from the first set of actions, a subset of actions to execute to respond to the attack that occurred;

executing the subset of actions; and determining that the attack that occurred no longer presents a threat.

2. The method of claim 1, wherein the description of the attack that occurred comprises one element of a group containing a start time, a stop time, and a duration.

3. The method of claim 1, wherein the description of the attack that occurred comprises one element of a group containing an indication of a source of the attack and an indication of a destination of the attack.

4. The method of claim 1, wherein the description of the attack that occurred comprises one element of a group containing a packet count, an attribute of a packet header, a packet signature, an indication of a protocol, a regular expression, and a priority.

5. The method of claim 1, wherein a device or application is relevant to the attack that occurred if the attack originated outside the network and if the device or application is located on a logical border of the network.

6. The method of claim 1, wherein a device or application is relevant to the attack that occurred if the device or application is located on a logical path from a source of the attack to a destination of the attack.

7. The method of claim 1, wherein a device or application is relevant to the attack that occurred if the device or application is vulnerable to the attack.

8. The method of claim 1, wherein determining, based on the one or more relevant devices or applications, the first set of actions that can be executed to respond to the attack that occurred comprises determining one or more capabilities of the one or more relevant devices or applications.

9. The method of claim 1, wherein determining, based on the one or more relevant devices or applications, the first set of actions that can be executed to respond to the attack that occurred comprises determining states of availability of the one or more relevant devices or applications.

10. The method of claim 1, wherein determining, from the first set of actions, the subset of actions to execute to respond to the attack that occurred comprises determining a most effective action from the actions within the first set.

11. The method of claim 1, wherein determining, from the first set of actions, the subset of actions to execute to respond to the attack that occurred comprises identifying, from the one or more relevant devices or applications, a device or application that is logically closest to a source of the attack.

12. The method of claim 1, wherein executing the subset of actions comprises modifying a setting of a device or application.

13. The method of claim 1, wherein executing the subset of actions comprises controlling operation of a device or application.

14. The method of claim 1, further comprising responsive to determining that the attack that occurred no longer presents the threat, reversing the executed actions.

\* \* \* \* \*